Aug. 2, 1932.  C. W. GREEN  1,870,004
CASH REGISTER
Filed June 8, 1925   6 Sheets-Sheet 1
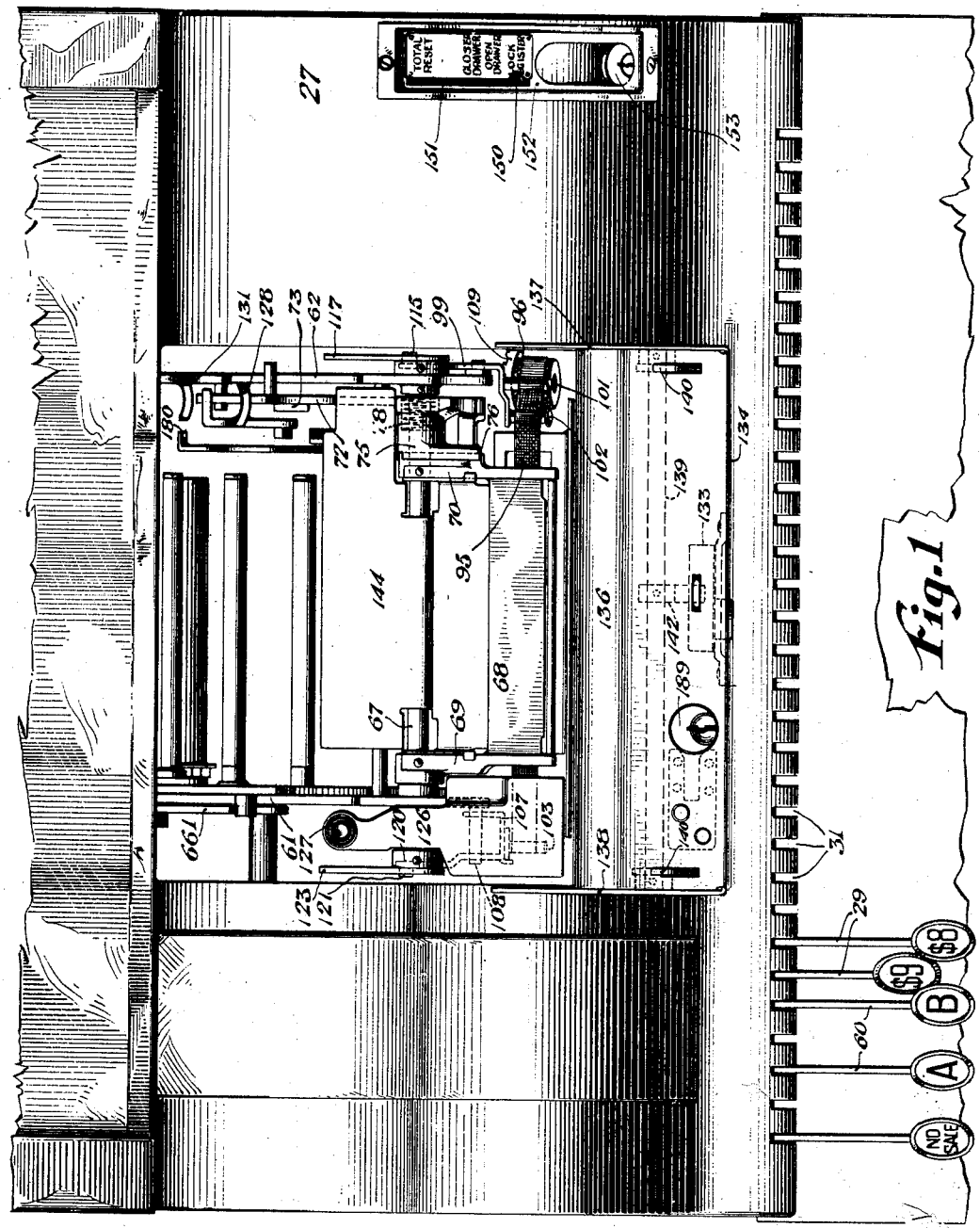
Inventor
Charles W. Green
By
Attorneys

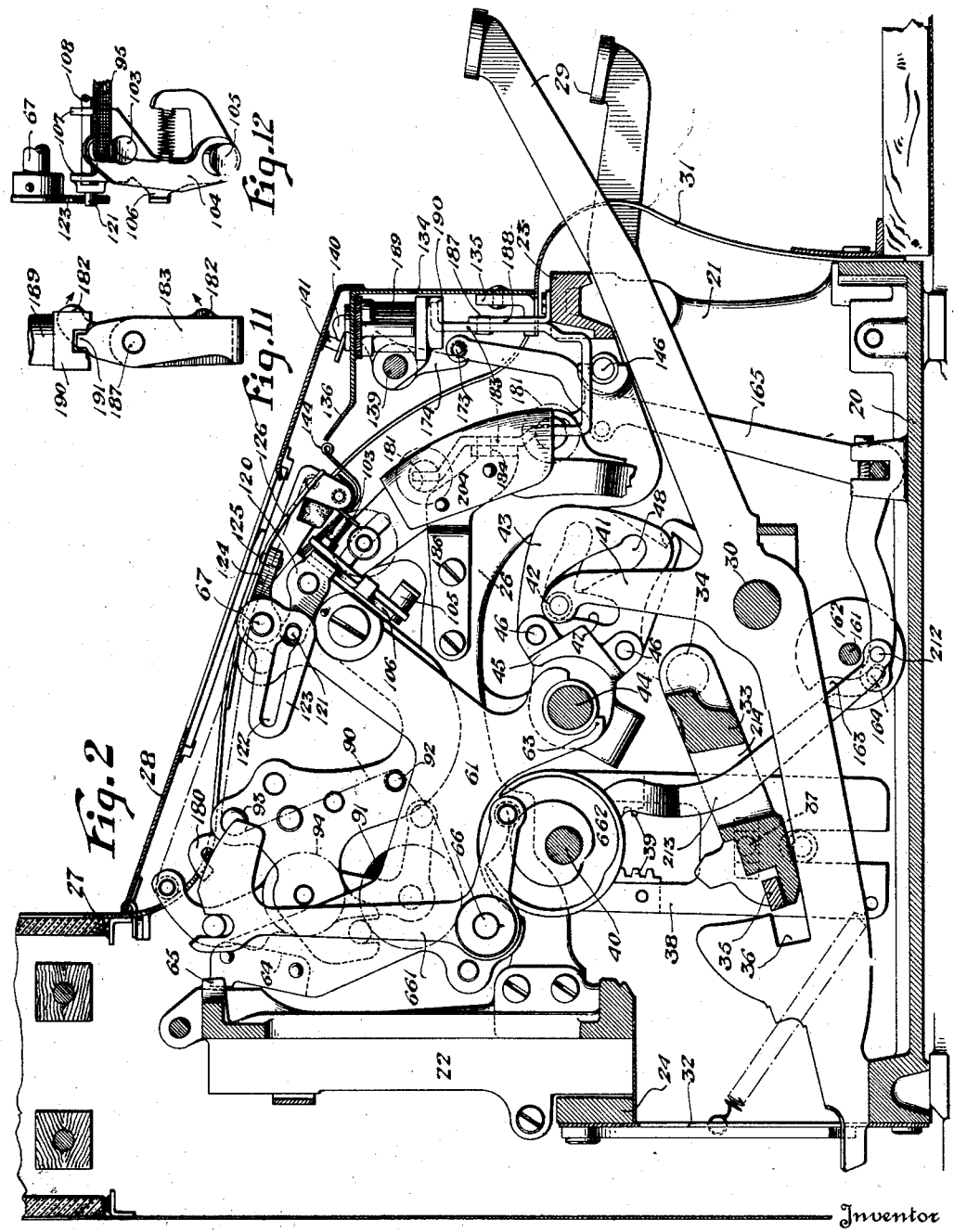

Aug. 2, 1932.  C. W. GREEN  1,870,004
CASH REGISTER
Filed June 8, 1925  6 Sheets-Sheet 3
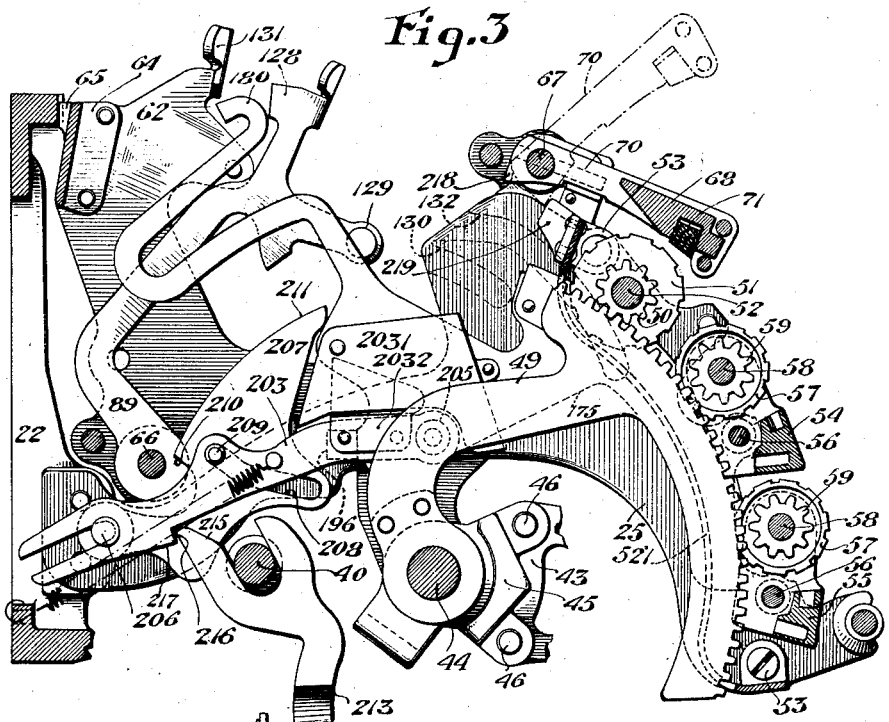
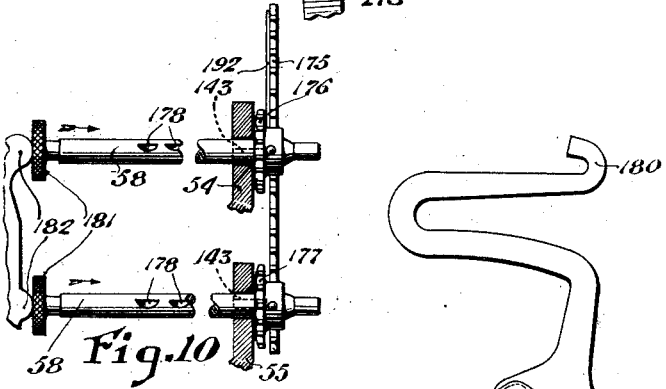
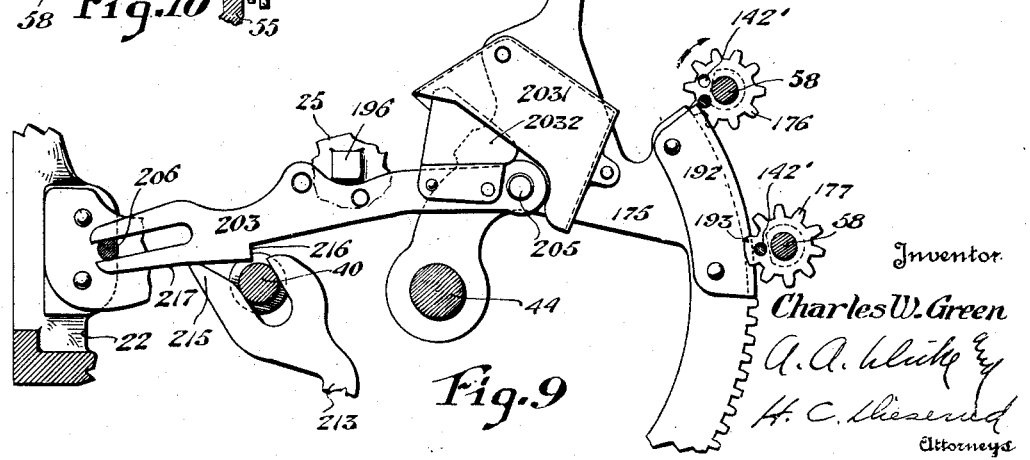
Inventor
Charles W. Green
Attorneys

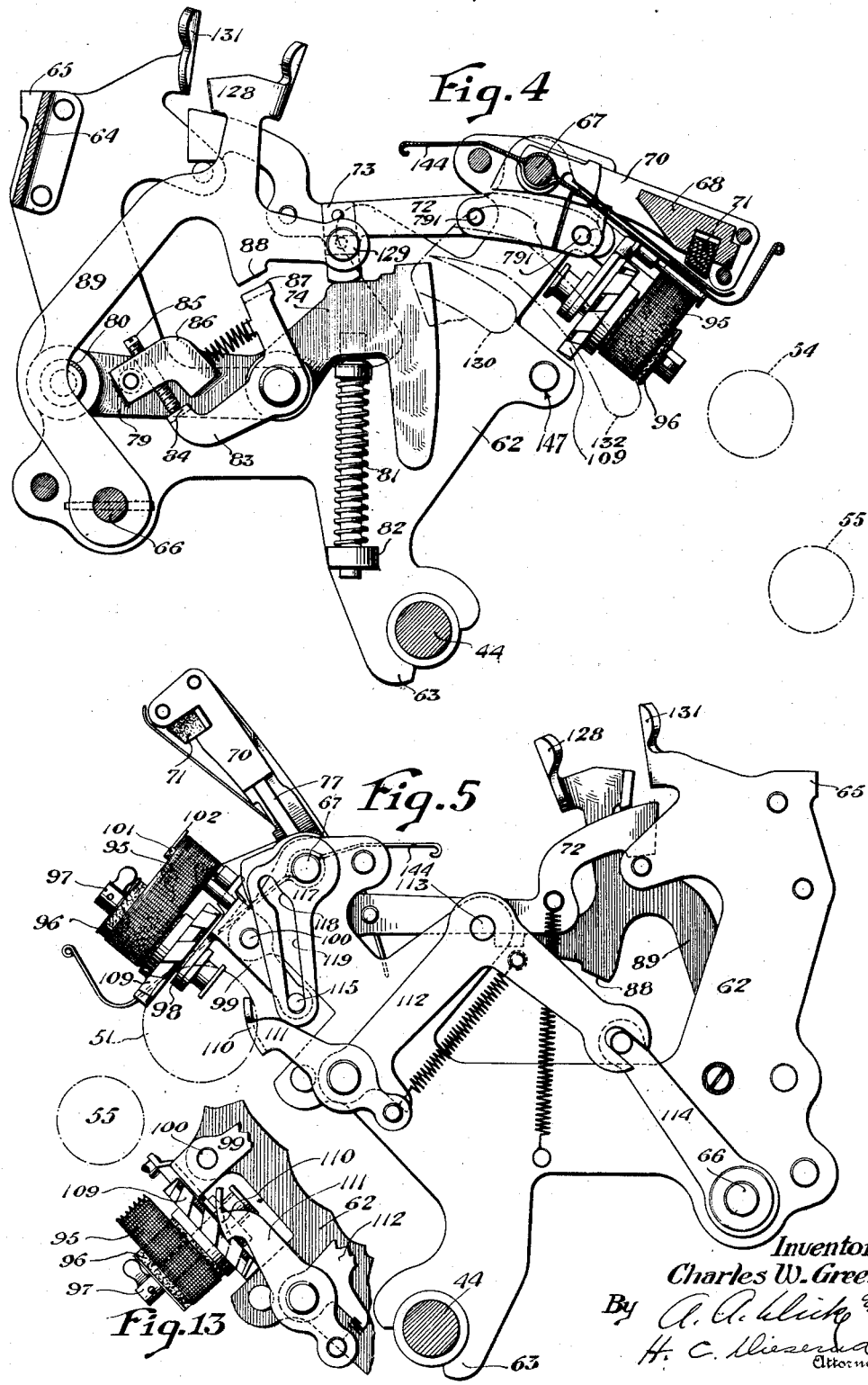

Aug. 2, 1932.  C. W. GREEN  1,870,004
CASH REGISTER
Filed June 8, 1925  6 Sheets-Sheet 5
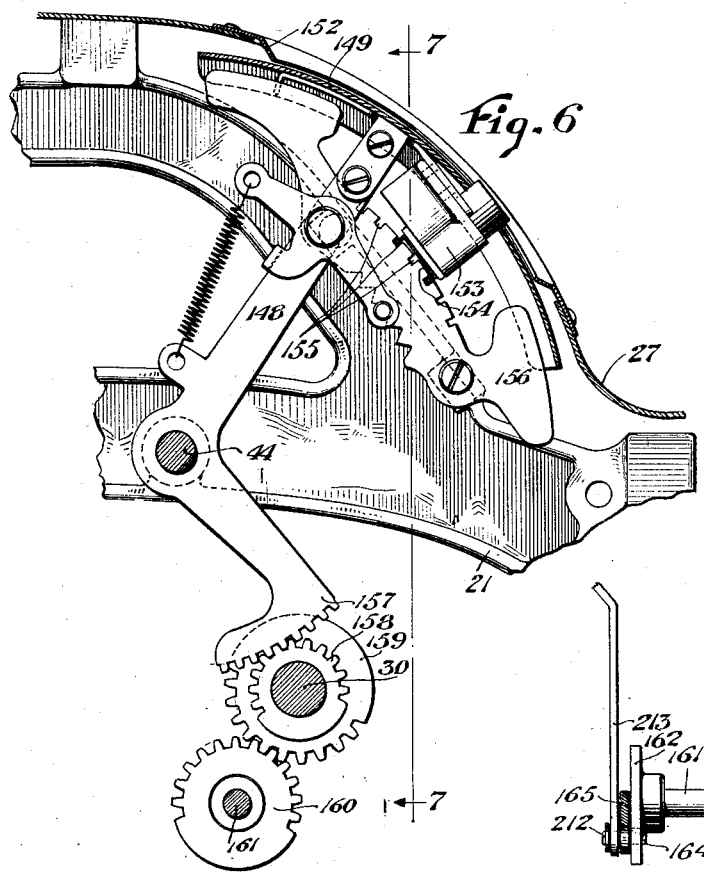
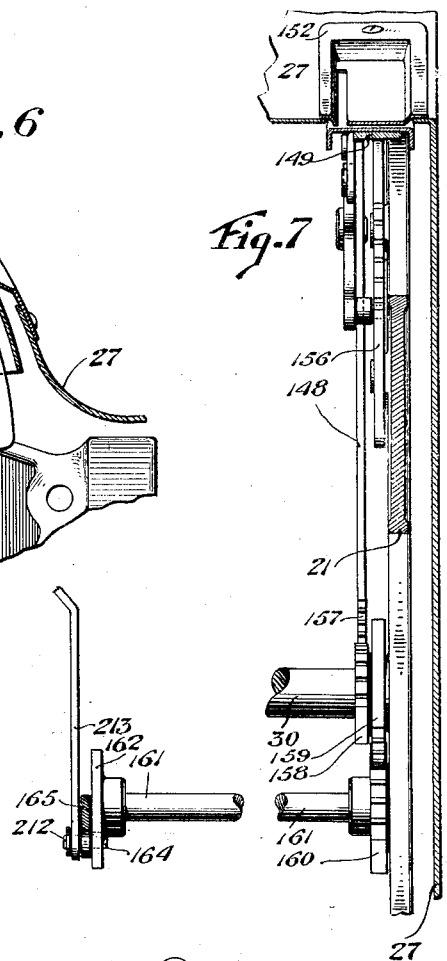
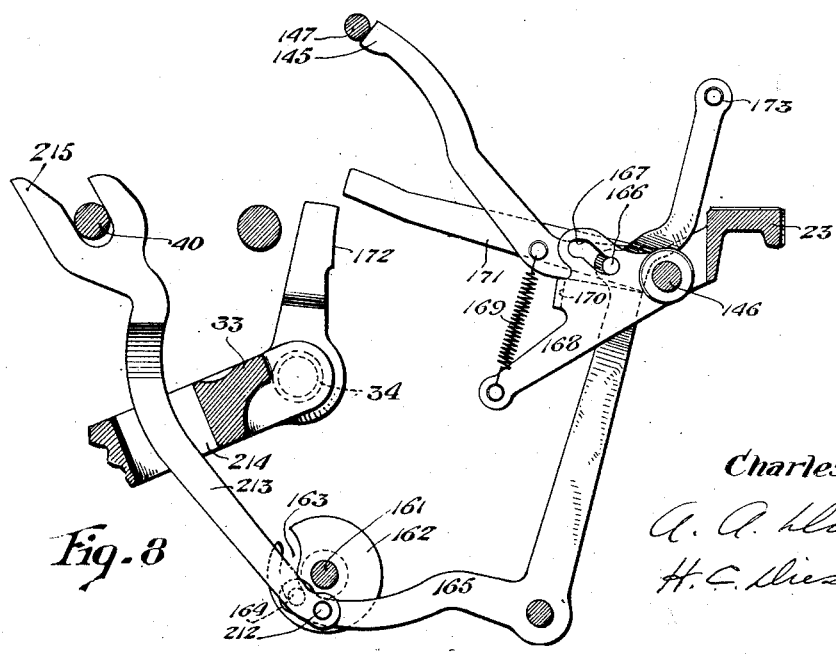
Inventor
Charles W. Green
Attorneys

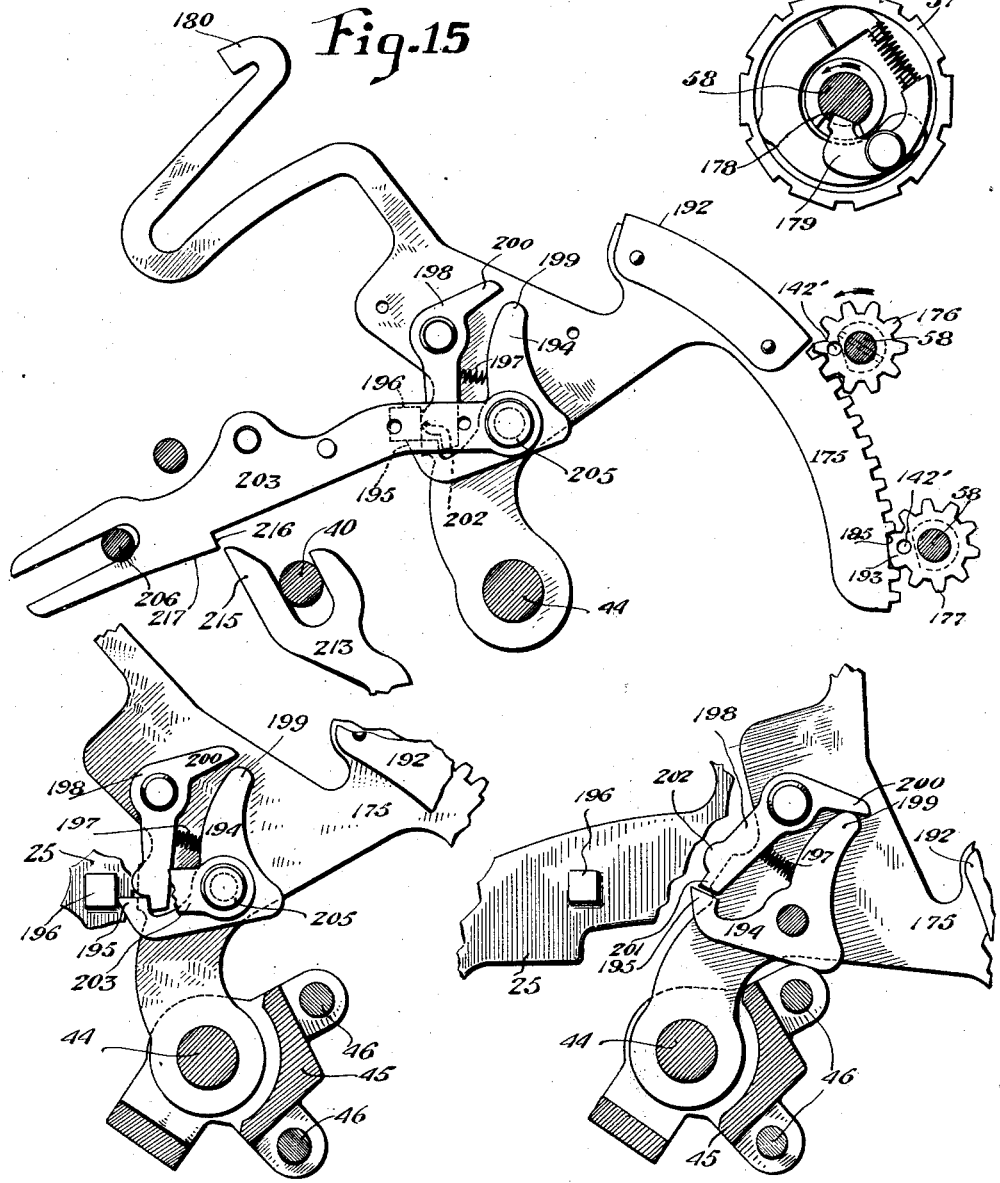

Patented Aug. 2, 1932

1,870,004

UNITED STATES PATENT OFFICE

CHARLES W. GREEN, OF ILION, NEW YORK, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed June 8, 1925. Serial No. 35,599.

This invention relates to cash registers and accounting machines, generally and more particularly to that class employing printing devices for printing accumulated items and totals.

One object of the present invention is to provide a plurality of printing totalizers, adapted to print totals accumulated thereby upon a record strip, associated with related devices to insure the correct printing of a total.

The present register has been designed particularly for use in chain stores, department stores or the like where the supervision of a number of registers is controlled by some person generally known as the auditor. The printing of the totals is placed under the control of the manager of the chain store or a department head in the department store, while periodically the auditor resets the totalizers for the next accumulation of the items comprising a subsequent period of business. It is a prime object of the present invention to provide a machine particularly adapted for a system of this type and the more specific features which will be mentioned have been designed with this in view.

In the past it has been frequently possible for a dishonest employee to manually rotate the totalizer elements of a cash register any desired amount and produce an erroneous record of the total. To preclude this possibility the present register has a hood securely fastened to the cabinet and so formed as to prevent access to the total printing elements. The hood just referred to co-operates with a plate carried by a movable printer frame so that when the printer is in any position it will be difficult to obtain access to the totalizer elements to manipulate them by the insertion of a tool or any other instrument. To insure proper operation of the total printing and resetting devices suitable interlocking devices are also provided as well as means adapted to enforce the complete operation of the resetting devices when once begun.

The machine as herein disclosed is provided with means to prevent raising of the platen when the printer frame is displaced from its normal position and to prevent the operation of the total taking devices when the platen is out of its normal position.

An object of the present invention is to provide interlocking devices between the operating keys, total taking means and resetting devices so that the operation of any of these devices will be insured and any irregular operations which would result in the printing of an incorrect total are prevented.

Another object of the present invention is to provide a manipulative device which is key controlled so arranged that when it is adjusted to a certain position it will permit item entering operations to be performed but will prevent the operation of a lever for resetting the totalizer, while adjustment of this manipulative device to another position will not only unlock the resetting lever, but directly operate certain mechanism for releasing a hinged lid under which the resetting lever is located. The interlocking devices between the resetting lever and the manipulative device are so constructed that when the resetting lever is partially operated it will be impossible to move the manipulative device from the position in which it unlocks the resetting lever.

Resetting, according to the invention, is performed by first inserting a key in a supplemental lock to prepare one of the several totalizers for resetting and then manipulating the resetting lever by giving it a full stroke to and fro. However, it is clear from what has previously been stated that before the lever can be operated to reset one of the totalizers the lock controlled manipulative device must have been previously adjusted to a certain position. In cases where the manipulative device is controlled by the proprietor it will be necessary, therefore, that he be present when the resetting operation is performed. In instances where both locks are to be controlled by one person one key may be made to fit both locks or the same person may have possession of the keys of both locks.

The machine as disclosed is provided with an improved construction for an endless inking ribbon whereby it will have connections to the operating mechanism to give it a step by step movement during successive registering or total printing operations. The ribbon supporting members are so designed that lifting of the platen will elevate both of the supporting members and the inking ribbon so as to facilitate access to the same when it is desired to replace a worn-out ribbon with a new one or saturate the inking roller. The construction is such that the elevation of the platen will not directly lift the ribbon supporting members and ribbon, but will permit of an idle movement of the platen to permit a separation between these members so as to facilitate the threading of the record strip when the paper supply is being replenished.

With these and incidental objects in view the invention consists in certain novel features of construction and combination of parts, the essential elements of which are set forth in the appended claims and a preferred form of embodiment of which is hereinafter described with reference to the drawings which accompany and form part of the specification.

Of said drawings:

Fig. 1 is a top plan view of the cash register to which the present invention is applied showing the clerk's keys and a few of the amount keys for item entering operations. One of the cabinet lids has been removed to more clearly illustrate the printing devices and the lock for permitting the resetting of either totalizer.

Fig. 2 is a sectional view of the cash register taken near the left end of the machine showing some of the keys, a portion of the printing devices, the differential mechanism for driving the totalizer elements, the resetting devices and a portion of the totalizer engaging mechanism.

Fig. 3 is a partial sectional view taken substantially through the center of the machine showing among other elements the means for preventing the operation of the total taking devices when the platen is raised and the interlocking mechanism between the resetting devices and the control lever.

Fig. 4 is a detail view in side elevation taken through the center of the printing mechanism showing one of the supporting means for the endless inking ribbon as well as the devices for actuating the platen to effect item or total printing.

Fig. 5 is a detail view in side elevation of the printer showing the mechanism for advancing the endless ribbon a step during each operation of the machine and the device controlled by the platen for lifting one of the ribbon supporting members.

Fig. 6 is a transverse sectional view showing the general control lever and the lock for holding it in its variously adjusted positions.

Fig. 7 is a view taken on the section line 7—7 of Fig. 6.

Fig. 8 is a partial view in side elevation showing the mechanism controlled by the control lever for unlocking the printer and the resetting lever when the control lever is adjusted to a certain position, and for simultaneously locking the key coupler.

Fig. 9 is a view showing the resetting device in its fully operated position as well as the lock which locks the control lever against movement when the resetting device has been partially operated.

Fig. 10 is a detail view showing a portion of the devices for shifting the totalizer resetting shaft for permitting a resetting operation.

Fig. 11 is a front view of the member controlled by the resetting lock for permitting the resetting of either totalizer.

Fig. 12 is a view of one of the ribbon supporting means as seen from the front of the machine.

Fig. 13 is a detail view of the ribbon feeding devices and the operating pawl showing the normal relationship between these parts.

Fig. 14 is a sectional view taken through one of the totalizers showing one of the total printing wheels, its associated resetting pawl and the shaft for zeroizing the totalizer elements.

Fig. 15 is a view showing the resetting devices and the full stroke enforcing mechanism as well as the interlocking devices between the resetting lever and the total printing mechanism.

Figs. 16 and 17 are detail views showing parts of the full stroke enforcing device in the positions they assume during different stages of the operating stroke of the resetting lever.

Reference to the detailed description which follows and which is divided under suitable headings will give a full understanding of the various features embodied in the present invention and their intended mode of operation.

For the purpose of illustration this invention has been shown as applied to a type of machine, the general principle of which is disclosed in United States Letters Patent Nos. 1,729,338 and 1,742,701, issued to Frederick L. Fuller and British Patents #135,-465;—140,363;—157,823;—157,824 and 157,-825. It is to be understood, however, that this invention is not limited to this type of machine, but may, with slight modifications be applied to other well known forms of accounting machines.

Framework

The various parts of the mechanism are supported by a suitable framework comprising a base casting 20 (Fig. 2) and suitable side frames, a portion of one of which is shown in Fig. 6 and indicated by reference character 21. The main side frames are connected at their upper rear ends by a framework 22 and cross connections in the form of tie bars 23 and 24 situated between the front and rear of the machine respectively. The present machine is also provided with two intermediate and parallel supporting frames 25 and 26, (shown in Figs. 2 and 3). The mechanism is enclosed by a cabinet 27 (Figs. 1 and 2) which has hinged thereto a flat lid 28 for providing access to the printing mechanism for replenishing the paper supply and permitting total printing.

*Keys and operating mechanism*

The illustrative machine is provided with a number of groups of amount keys, one group for entering amounts from 1¢ to 9¢, the second group for registering amounts ranging from 10¢ to 90¢ and a third group for amounts ranging from $1 to $9. Since the construction and operation of the keys related to the various groups are alike a description of the manner of operation of one of the groups will suffice for all. To this end the operation of the keys related to the dimes group will be given, reference being had particularly to Fig. 2.

The amount keys 29 associated with the dimes bank are pivoted upon a shaft 30 extending transversely of the machine and journalled between the side frames. The keys are guided in their reciprocating movements by slots 31 formed in the front part of the cabinet 27 and are furthermore guided at their rearward ends by a vertically slotted plate 32 attached to the tie bar 24.

Resting upon the rear ends of the keys is a key coupler 33 journalled at 34 between the side frames. The key coupler has a nose 35 co-operating at times with notches 36 formed in the rear ends of the keys 29. When the outer ends of the keys are depressed the key coupler is rocked clockwise (as viewed in Fig. 2) and the nose 35 enters the notches 36 formed in the rear end of the keys. The purpose of such key coupler mechanism is well known in the art and need not be discussed herein.

Connected to the key coupler 33 at 37 is a vertically reciprocating rack plate 38 provided with oppositely facing rack teeth 39 which alternately mesh with a gear (not shown) fast to a main operating shaft 40 journalled between the machine side frames. The arrangement of this mechanism is such that a reciprocation of the key coupler 33 by the keys will effect a complete rotation of the gear and the shaft 40 to which the gear is secured. The shaft 40 is provided with cams or other suitable devices for operating various parts of the registering and printing mechanisms.

Some suitable form of full stroke mechanism to compel a complete operation of the machine when once started may be provided, but mechanism for accomplishing this function is well known in the art and need not be described in detail herein. For a full disclosure of this mechanism reference may be made to the patents previously mentioned.

*Differential mechanism*

The differential mechanism or the devices controlled by the various groups of keys for adjusting the item type carriers and actuating the different totalizers are all similar in construction and principle of operation and a description of one will suffice for all.

As best shown in Fig. 2, each of the amount keys 29 is provided with an upwardly extending arm 41 carrying a suitable anti-friction roller 42 co-operating with differential slots formed in cam plates 43. Loosely mounted upon a transverse shaft 44 is a frame 45 provided with spaced slots in which are secured by pins 46, a series of the cam plates 43 one for each key. The cam plates 43 are provided with L shaped slots 47 and 48, the slots 47 being concentric with respect to the shaft 44. The slots 48 are, however, graduated so that when the roller 42 carried by the arm 41 of a depressed key 29 operates in the slot 48 of its associated cam plate 43 it will move the frame 45 differentially and to an amount commensurate with the value of the key depressed. When, however, the frame 45 is operated by the depression of a key 29 of a certain group the rollers 42 of the undepressed keys of the same group will play in the arcuate slots 47 thereby permitting the frame 45 to be raised differentially without interfering with the rollers 42 of the unoperated keys.

It is to be understood that there is a differential frame for each group of amount keys, and that each frame is similarly constructed so that if three keys relating to the same number of groups are depressed the frames will be operated differentially to amounts commensurate with the values of the keys depressed.

As is shown in Fig. 3 the differential frame 45 has attached thereto a segmental rack 49. In continuous mesh with the teeth of the segmental rack 49 is a pinion 50 attached to an item type wheel 51 mounted upon a shaft 52 and adapted to print upon a record strip. From the above it will be evident since there may be nine keys in a particular group and a corresponding number of cam plates 43 the segmental rack 49 and type carrier 51 may be brought to any one of the nine different positions by the depression of a key 29 associated with such group of keys. In a manner similar to this the keys associated with any of the differential groups will adjust their related type carriers so that when printing is effected the type wheels will print characters corresponding to the value of the keys depressed. In order to guide the segmental racks 49 associated with the three groups of keys in their reciprocating movements there is provided a bent plate 521 which extends between the intermediate frames 25 and 26 and is attached thereto by means of screws 53. The plate 521 is provided with a series of slots through which the several segmental racks 49 project so as to guide the latter during their reciprocating movements.

*Totalizers and totalizer engaging mechanism*

Situated below the type carriers 51 are two pivotally mounted totalizers 54 and 55. The form of the totalizers is shown in the patents hereinbefore mentioned and generally in Fig. 3. Each totalizer is pivotally mounted at 56 between the intermediate frames 25 and 26. The wheels 57 for each totalizer are mounted upon a shaft 58 journalled in the totalizer frame and the peripheries of the wheels are formed with raised characters so as to effect printing upon a suitable impression material. Attached to the totalizer elements are pinions 59 which are adapted at times to be brought into mesh with the teeth of the segmental racks 49 by rocking the desired totalizer frame about its pivotal point 56.

The totalizers 54 and 55 may be utilized for the purpose of registering amounts for separate departments or clerks or to segregate the transactions into any other two classes. The entering of the items into the totalizers selectively is directly controlled by means of a group of two clerk's keys designated by reference characters 60 and shown in Fig. 1. In practical use each clerk is assigned a particular totalizer and the corresponding clerk's key so that the proprietor is able to ascertain the amount of the sales of the respective clerks operating the machine. By simply adding together the amounts of the sales of the clerks the aggregate amount of business transacted by all the clerks during a particular period may readily be obtained.

The engagement of the selected totalizer with the actuators is directly under control of its corresponding clerk's key 60, and the means for accomplishing this is shown and described fully in the patents hereinbefore mentioned. In general terms however, it may be stated here that suitable mechanism is adapted to be operated by a clerk's key to cause the pinions of the desired totalizer to be brought into operative relationship with the teeth of the segmental racks before the latter are moved differentially. During the downward depression of the amount keys the frames 45 will be operated differentially and by means of the engagement of the totalizer pinions and the operated segmental racks 49 an amount will be inserted in the totalizer commensurate with the value of the key or keys depressed. At the extreme end of the downward stroke, or if desired, during the first part of the upward stroke of the keys the selected totalizer is disengaged from the actuators and remains disengaged during the time the keys are returned to their normal position.

*Record strip printing mechanism*

It is desirable each time an item is entered in the machine that its amount as well as a character designating the clerk operating the machine be printed upon a record strip. The record strip thereby provides a complete record of all the transactions entered in the machine, and at the end of any particular period it may be detached from the machine and stored away for future reference. The printing mechanism for printing these items as well as the totals standing upon the totalizer comprises a pivoted printing frame formed of two side frames 61 and 62 (Figs. 1, 2, 3, 4 and 5), the lower ends of which are provided with claws 63 overlying the shaft 44. The frames 61 and 62 are connected together by a cross member 64 and shafts and other members which will be referred to hereinafter. Normally the printing mechanism rests by its own weight in the position shown in the figures with lugs 65 integral with the side frames 61 and 62 contacting with a portion of the frame 22. In this normal position the printing mechanism is adapted to print the items entered in the machine upon the record strip, but it may be rocked downwardly under the control of separate manipulative devices to print from either the upper totalizer or the lower totalizer as will be more clearly described hereinafter.

Journalled in the printing side frames 61 and 62 is a shaft 66, the extreme left end of which has fastened to it a bell-crank 661 carrying a roller which co-acts with the race of a box cam 662 fast to the shaft 40. As has been mentioned hereinbefore the shaft 40 is given a complete rotation during each operation of the machine and the rotation of the box cam will rock the shaft 66 to actuate a platen and to feed the record strip and the inking ribbon.

Extending transversely of the printer side frames 61 and 62 is a platen supporting shaft 67 upon which is supported a platen 68 by means of forwardly extending arms 69 and 70 secured to the shaft 67. The under face of the platen is provided with a rubber impression block 71 (clearly shown in Figs. 3, 4 and 5).

Extending rearwardly from and movable with the right arm 70 is a platen actuating arm 72 attached to which is a block 73 which is actuated by a hammer 74 to force the impression block 71 against the type to take an impression. The platen 71 is not directly connected to the platen actuating arm 72, but is connected to it by a clutch member 75 (Fig. 1). The clutch member 75 is loosely mounted on the shaft 67 and it is adapted to connect or disconnect the arm 72 from the platen and is provided with a groove 76 adapted to engage a rib 77 (Fig. 5) formed on one side of the platen supporting arm 70. A spring 78 surrounds the shaft 67 and tends to force the groove 76 into normal or locking position with respect to the rib 77 on the platen arm 70. As is best shown in Fig. 4 the clutch 75 is connected to the arm 72 by means of pins 79 so that the two members will rock as an integral unit.

To disengage the platen 68 from the actuating arm 72 so that the platen may be lifted upwardly as shown in Fig. 5 in order to obtain access to the item type wheels, or to insert a new block 71 in the platen or for another reason which will be stated hereinafter, all that is necessary is to manually slide the clutch 75 to the right as viewed in Fig. 1 to disengage the groove from the locking rib 77 and lift the platen upwardly.

For actuating the platen 70 to take an imprint the hammer 74 (Fig. 4) is provided and is formed as part of an arm 79 pivoted to the inside of the right printer side frame 62 by a stud 80. The hammer 74 is normally urged upwardly by means of a spring 81 bearing against a lug 82 carried by the right printer side frame 62. The arm 79 is provided with a spring-pressed retracting pawl 83 having a tail 84 bearing against an adjustable stop 85 passing through a member 86 attached to the arm 79. The pawl 83 has a lug 87 co-operating with a nose 88 formed as part of an arm 89 secured to the main printer shaft 66. When the arm 89 is rocked clockwise during an item entering operation as viewed in Fig. 4, by means of the bell-crank and the shaft 66 to which the bell-crank is secured, the nose 88 will bear against the lug 87 of the pawl and retract the hammer 74 against the tension of the spring 81. Upon a further movement of the arm 89 the nose 88 will clear the lug 87 of the pawl 83 and permit the hammer portion 74 to strike the lug 73 and through the clutch connection 75 rock the platen 68 downwardly to effect a printing impression from the adjusted type carriers.

The record strip upon which are printed items and totals is shown diagrammatically in Fig. 2, the record strip 90 extending from a supply roll 91 around suitable guide rollers 92 and 93, around the platen 68, around other guide rollers and finally back to a storage roll 94. The details of the record strip, as well as the means for advancing it during an operation of the machine are fully set forth in the before-mentioned Fuller Patent No. 1,742,701 and therefore need not be described herein.

There is provided, as shown in the patents previously mentioned, an endless inking ribbon for inking the various type carriers when printing is effected. Co-ordinated with the endless inking ribbon are means for effecting a step by step movement whereby different portions of the inking ribbon may be used to ink type carriers, thereby preventing constant printing from the same portion of the ribbon. The endless inking ribbon device embodied in the present invention is different in some respects from that shown in the patents referred to. The description of the new inking mechanism will now be given and the various improvements which have been incorporated therein described in detail.

The endless inking ribbon 95 (Fig. 5) passes over a felt inking spool 96 saturated with a supply of ink. The inking spool is loosely mounted on a shaft 97 and carried by a plate 98 which is bent transversely to form an arm 99 which is pivoted at 100 to the right printer side frame 62. The inking ribbon passes upwardly over a guide stud 101 (Figs. 1 and 5) carried by the plate 98 and then over a spool 102 also carried by the plate 98. The upper branch of the ribbon passes under the rubber impression block 71 to the other side of the machine where it is looped over a roller 103 (Fig. 12) which is carried by a spring-urged arm 104 (Fig. 12) pivoted at 105 to a downwardly extending member 106 integral with a yoke 107 (Fig. 1) loosely mounted upon a stud 108 attached to the left printer side frame 61. It will be noted, therefore, at this point, that the endless inking ribbon is supported at its extreme ends by the members 107 and 99 which are pivoted by means of studs 108 and 100 respectively so that these members may be rocked about their pivotal points to elevate the ribbon supporting members, together with the ribbon from the normal operating position.

The inking spool 96 has a pin and slot connection to a ratchet toothed wheel 109 and when the ribbon supporting frames are in their normal position the teeth of the ratchet wheel are adapted to co-operate with a curved lug 110 integral with a spring-urged operating pawl 111 carried by a bell-crank 112 pivoted at 113 to the outside of the right printer supporting frame 62. The rearward arm of the bell-crank 112 has a pin and slot connection to an arm 114 fast to the shaft 66.

It will be clear from Figs. 5 and 13 that when the shaft 66 is rocked during the downward depression of one of the operating keys the bell-crank 112 will be rocked clockwise and the pawl 111 will be lifted upwardly so that the lower edge of the curved lug 110 will engage the upper edge of one of the ratchet teeth. During the return movement of the operating keys and after the printing operation the shaft 66 will be rocked clockwise (Fig. 5) thereby forcing the pawl 111 downwardly and through the co-operation of the lug 110 with the teeth of the ratchet wheel 109 will turn the inking spool 96 slightly, thereby causing the advancement of the endless inking ribbon a step during each operation of the machine.

It is desirable, of course, at times to obtain access to the inking spool to saturate it with ink and it is furthermore necessary at times to replace a worn-out inking ribbon. In the machine as disclosed, there is provided a simple and effective means whereby the inking ribbon together with the members which support it may be lifted so as to facilitate replenishing the ink supply or the replacement of the inking ribbon. To this end the arm 99 which supports the inking ribbon at its right end is provided with a stud 115 (Fig. 5) which is adapted to co-operate with a slot formed in a plate 117 fast to the right end of the shaft 67 previously mentioned. The slot in the plate 117 is formed with an arcuate portion 118, concentric with respect to the shaft 67, and a cam portion 119.

The other ribbon supporting device located at the other side of the printer frame has an arm 120 (Figs. 1 and 2) which is integral with the yoke 107 and carries a pin 121 which likewise co-operates with a similarly shaped slot 122 formed in the plate 123 attached to the extreme left end of the shaft 67.

As has been previously stated the platen may be manually elevated for the purpose of inserting a new supply of paper in the machine or obtaining access to different parts of the mechanism for other reasons and in order to facilitate the lifting of the platen 68 there is attached to the shaft 67 a member 124 (Fig. 2) to which is secured by pins 125 a plate 126 the extreme rearward end of which is formed with a finger-piece 127 (Fig. 1). It will be clear, therefore, that when the platen is unlocked it may be elevated at will by simply pressing on the finger-piece 127 and thereby rocking the shaft 67 and lifting the platen 68. It will be noted that during the first partial elevation of the platen when the shaft 67 is rocked the studs 115 and 121 will merely play in the arcuate slots formed in the plates 117 and 123. This will permit the platen to be elevated without effecting any movement of the inking ribbon or its supporting members, thereby affording a separation between the platen and the inking ribbon to facilitate the insertion of one end of the record strip when replenishing the paper supply. However, a continued upward movement of the platen beyond this position will cause a co-operation of the studs 115 and 121 with the cam portions of the slots formed in the members 117 and 123 respectively to raise the ribbon and supporting members. When the platen has reached its extreme upward position (as shown in Fig. 5) the inking ribbon and supporting members will have been rocked through an angle of approximately 90° carrying these parts to such a position that replacement of a ribbon or saturation of the inking spool may readily be accomplished.

*Total printing*

As has been premised hereinbefore the printer frame is normally in such a position as to print the items entered in the machine upon the record strip, but it may be rocked downwardly under the control of separate manipulative devices to print from either totalizer by means which will now be described in detail.

To take the total from the upper totalizer all that is necessary is to swing the printer frame until the platen is directly over the totalizer and when the platen is in this position it will automatically be actuated and the total standing on this totalizer printed upon the record strip.

To rock the printer frame downwardly there is provided a manipulative device 128 (Fig. 4) which is integral with the arm 89 above-mentioned. The manipulative device 128 has secured thereto a pin 129 which is adapted to co-operate with a groove 130 formed in the right hand supporting frame 25, which it will be recalled, serves as a support for the totalizers and the item printing wheels. Thus, when it is desired to take a total from the upper totalizer the manipulative device 128 is grasped and by drawing it forward the printer frame will follow and rock about the shaft 44 as a pivotal point, while at the same time the lever 89 and shaft 66 will rock slightly in relation to the printer frame and the stud 129 will enter the groove 130. Further movement of the printer frame will, due to the shape of groove 130, cause further clockwise rotation of the shaft 66 to the same extent that the box cam 662 rocks it during a regular operation of the machine. The parts are so proportioned that the printing hammer 74 will be released at substantially the time that the platen 68 overlies the total printing elements of the upper totalizer. The end of the groove 130 serves to positively stop the forward movement of the printer frame when it is in its proper position to print a total from the totalizer. Whenever a total is printed the record strip will be fed, in a manner described in detail in the Fuller Patent No. 1,742,701, so that after each total printing operation, just as in item printing operations the record strip will be fed an increment.

It is also clear from Figs. 5 and 13 that since the shaft 66 is rocked during the total printing operation it will also rock the bell-crank 112 and by means of the pawl 111 co-acting with the teeth of the ratchet wheel 109 rotate the inking spool 96 slightly and thereby causing an advancement of the inking ribbon 95 in the same manner as when an item is registered in the machine.

In order to obtain the total of the amounts standing on the lower totalizer there is provided a manipulative device 131 which is integral with the right printer side frame 62. As best shown in Fig. 3 it will be seen that the supporting frame 25 is provided with a second slot 132 longer than the slot 130 previously referred to and having a different curvature. The stud 129 referred to hereinbefore is adapted also to co-operate with the slot 132. When the printer frame is rocked about its pivotal point by means of grasping the manipulative device 131 and drawing it downwardly the stud 129 will first be moved in an arc about the shaft 44 as a center and will enter the slot 132 which will subsequently cause a relative turning movement of the shaft 66 in the frame, thereby retracting and releasing the hammer 74 for printing at substantially the time the platen is over the lower totalizer.

In order to cover and conceal the record strip printing devices and totalizers, the lid 28 previously referred to is provided. The lid 28 is controlled by a lock 133 (Fig. 1) carried by a hood 134 attached to the cabinet 27. The key of this lock is usually retained by the clerk operating the machine so he can raise the lid 28 to obtain access to the paper holding mechanism in order to replenish the supply of paper when it is exhausted.

The manner in which the unlocking of the lid is performed will now be described in detail, reference being had particularly to Figs. 1 and 2. The hood 134 (Fig. 2) is formed with a vertical portion attached to the cabinet 27 by means of brackets 135 and is bent over to form a cover 136. In order to conceal and protect the mechanism which is under the hood 134 the vertical portion is bent transversely to form side plates 137 and 138 (Fig. 1). The lower edges of the side plates may be secured to the cabinet by any desirable means. Journalled between the side plates 137 and 138 is a shaft 139 (Figs. 1 and 2) to which is secured hooks 140 engaging flange studs 141 carried by the upper lid 28. Attached to the shaft 139 at its mid-portion is an arm 142 which is operated by the bolt of a lock 133. Operation of the bolt of this lock by the clerk's key will disengage the hooks 140 from the flange 141 and permit the raising of the lid to obtain access to the paper supply when it requires replenishing. It will be apparent from an inspection of Fig. 2 that the portion 136 of the hood 134 to a certain extent covers and conceals the totalizer elements to aid in preventing any tampering with the wheels to rotate them backwardly by the insertion of an instrument, such as a wire, whenever the lid 28 is opened. To further aid in preventing this improper tampering with the totalizer elements there is loosely pivoted on the shaft 67 a bent plate 144 (Figs. 1, 2, 4 and 5) which passes between the upper faces of the type carriers and the lower branch of the ribbon 95 and which is not raised by the movement of the ribbon frame as previously described. The forward portion of the plate 144 is curved upwardly as shown in Fig. 2 so that is rests quite closely against the rearward edge of the horizontal plate 136, thereby effectively closing the gap which would have been left if the plate 144 were not provided. With this construction it would be quite difficult to insert an instrument to fraudulently rotate the totalizer elements.

*Locks for controlling total printing*

As shown in Fig. 1 the manipulative devices 128 and 131 for obtaining the printed totals are located under the lid 28 and since the clerks operating the machine have possession of the keys of the lock controlling the release of this lid an additional lock is preferably provided for preventing unauthorized persons from operating the manipulative devices for securing the printed totals. This lock comprises a rearwardly extending arm 145 (Fig. 8) secured to a shaft in alignment with but rockable independently of a shaft 146, shown in this figure, the arm having its end normally in the path of a stud 147 secured to the right printer side frame 62. When the locking arm is in this position it will be impossible to rock the printer frame downwardly to take a total, and in order to unlock the printing mechanism to perform total printing there is provided a supplemental lock which has connections to the arm 145 to control it so as to bring it out of engagement with the stud 147 carried by the right printer side frame. The lock and the connections to the arm 145 will now be described in detail, reference being had to Figs. 1 and 6.

Loosely pivoted upon the segment shaft 44 is a control lever 148 having secured thereto a concentric plate 149 slidable beneath the cabinet 27 of the machine. The plate 149 carries a pointer 150 which is slidable in a slot 151 formed in a plate 152 attached to the machine cabinet, the said plate bearing at the desired places engraved characters and words representing the different controls over the machine, such as, "Closed drawer" operation in which the closing of the cash drawer is compelled before the machine can be subsequently operated;—"Open drawer" operation in which the machine may be operated without necessitating the closing of the cash drawer during successive registering operations; "Lock register" condition under which the registering mechanism is entirely locked against operation and the fourth or uppermost position of the pointer may be what is known as "Total and reset" position and when the control lever is adjusted to this position the cabinet lid 28 is unlocked and the machine conditioned for printing totals and resetting the totalizers.

Only the mechanism which is appurtenant to the last mentioned position will be described, as the other devices form no part of the present invention and need not be described herein in detail. For further and full disclosures of the remaining features, reference may be had to the patents referred to.

Attached to the plate 149 by any desirable means is a lock 153 which projects through a slot in the plate 152 and has at its lower end a flange 154 to engage notches 155 in a plate 156 attached to the side frame 21. The flange 154 is provided with a slot (not shown) which is adapted to be brought in the plane of the plate 156 by rotation of the lock.

To adjust the control lever to the "Total and reset" position all that is necessary is to insert the key in the lock to rotate the barrel a quarter turn and thereby bring the slot in the flange 154 into the plane of the plate 156 and move the key and parts movable therewith so that the index points to the desired legend. The key is then given a quarter turn in the reverse direction so that the flange 154 of the barrel will co-operate with the adjacent notches 155. Upon removal of the key the control lever will be locked in its set position.

The lever 148 is provided with a rack segment 157 meshing with a gear sector 158 fast to the right hand end of the key shaft 30. Also secured to this shaft is a somewhat larger gear sector 159 meshing with another gear sector 160 rigidly mounted on a transverse shaft 161 (Fig. 7) which carries toward the center of the machine a disk 162 formed with a cam slot 163 (Fig. 8) co-operating with a stud 164 carried by the rearward arm of a bell-crank 165.

The upper arm of the bell-crank 165 carries a pin 166 co-operating with a cam slot 167 formed in an arm 168 loosely mounted upon the shaft 146 carried by the tie bar 23. A spring 169 is connected between the rearward end of the arm 168 and the locking member 145 so that the lower edge of the locking member 145 contacts with a lug 170 formed on the arm 168. The slot 163 formed in the disk 162 is provided with a dwell and a camming portion, the result of this being that if the control lever is moved to any of the three lower positions there would be no effect upon the bell-crank 165 or the arm 168. However, when the control lever is moved upwardly to the "Total and reset" position the shaft 161 will be rocked sufficiently so that the cam portion of the slot just mentioned will become effective. The result of this is that the cam portion of the slot 167 will cause the arm 168 to be rocked counter-clockwise and through the spring connection will permit the lowering of the arm 145 to bring it out of engagement with the stud 147 carried by the right printer side frame.

The printing mechanism is now unlocked for operation, thereby permitting the printing of totals from either totalizer as desired. Also secured to the shaft to which the locking arm 145 is secured is another locking arm 171 which is adapted to be brought in front of an arm 172 carried by the key coupler 33. It will, therefore, be seen that when the arm 145 is lowered to release the printing mechanism the arm 171 will pass in front of the arm 172 thereby locking the key coupler and the operating keys as long as the printing mechanism is unlocked for total printing operations.

*Lid control by supplemental lock*

It is necessary, of course, before total printing can be accomplished by operation of the various manipulative devices 128 and 131, to unlock the lid 28 previously mentioned. This, of course, can be accomplished by the operation of the lock usually controlled by the clerk as before described. However, the illustrative embodiment also includes means whereby when the control lever is moved to the "Total and reset" position it will also operate the shaft 139 to disengage the hooks 140 from the flanged studs 141. To this end the extreme upward end of the bell-crank 165 is provided with a pin 173 (Figs. 2 and 8) co-operating with an arm 174 fast to the shaft 139 previously mentioned. Rocking of the bell-crank 165 by movement of the lever to the "Total and reset" position will, therefore, rock the shaft 139 to release the lid 28.

*Resetting devices*

After the amounts of the sales for a day or other regular intervals have been entered in the machine and the total thereof printed upon the record strip it is usually desirable to reset the totalizer so as to be able to accumulate the sales occurring during a subsequent period. The means for accomplishing this is best shown in Figs. 1, 2, 3, 9, 10, 11, 14 and 15. It will be seen that a resetting segment 175 is loosely pivoted upon the shaft 44 and provided with teeth to engage pinions 176 and 177 secured to the extreme right ends of the upper and lower totalizer shafts 58 respectively whenever the latter are shifted longitudinally. Each totalizer supporting shaft is provided with resetting notches 178 (Figs. 10 and 14) and the totalizer wheels with resetting pawls 179, having an end engageable with the notches in the shaft 58. Normally the engaging ends of the pawls are out of alignment with the notches in the shaft, but when the shaft 58 is shifted longitudinally the pawls 179 will be aligned with the notches 178 of the shaft 58 as shown in Fig. 14, at the same time that the pinion 176 or 177 is brought into mesh with the rack segment 175 so that when the resetting segment is operated it will rotate the gear attached to the extreme end of the shifted totalizer resetting shaft and notches will engage and pick up the variously positioned pawls and rotate the associated totalizer wheels to their zero positions. The manner in which the resetting shaft co-operates with the resetting pawls to perform the resetting operation is a well known expedient and described in the patents already mentioned.

Normally, as before stated, the gears 176 and 177 are out of mesh with the resetting segment 175, but they may be selectively shifted to the engaged position by means of a separate lock attached to the hood 134. As is best shown in Figs. 2 and 10 the shafts 58 are provided with knobs 181 which are adapted to co-operate with projections 182 integral with a yoke member 183 which is pivoted at its rearward end on a pin 184 carried by a bracket 186 attached to the right intermediate support frame 26. At its forward end the yoke member 183 is pivoted by a pin 187 (Fig. 11) carried by a bracket 188 screwed to the front tie bar 23. It will be evident, therefore, that by swinging the yoke member around its pivotal point one or the other of the shafts 58 will be shifted to bring the notches into alignment with the pawls on the associated totalizer wheels, depending, of course, upon the direction of the movement imparted to the yoke member 183.

To give the yoke member the desired movement to reset the totalizers selectively there is provided a supplemental lock 189 attached to the cover 136 as shown in Fig. 1. The barrel of the lock 189 which is beneath the cover 136 has attached thereto a flanged member 190 (Fig. 11) which is notched to receive a projection 191 integral with the yoke member 183. From this figure it will be clear therefore that by the rotation of the barrel of the lock in either direction from normal by the inserted key the yoke member 183 may be rocked in either direction so as to bring the notches of any desired resetting shaft in alignment with the pawls carried by the totalizer wheels mounted thereon.

Resetting is performed by simply inserting the key in the lock 189 and turning it in one direction or the other so that the proper gear is meshed with the teeth of the resetting segment 175 and then drawing the segment forwardly by means of the operating lever 180 which is located just beneath the locked lid 28.

To prevent the shaft 58 associated with the upper totalizer from being shifted when the resetting segment has been partially operated the segment 175 is provided with a plate 192 (Figs. 9, 10 and 15) which, as will be clear, will move into a position alongside of the teeth of the pinion 176 when the segment is moved from its normal position. It will also be clear that the plate 192 bearing against the side of the pinion 176, will, after the latter has been shifted, tend to hold it in this position during the complete stroke of the resetting segment.

Means has also been provided for preventing the resetting shaft 58 associated with the lower totalizer from being shifted when the resetting segment has been moved from its normal position. In this instance the gear 177 is provided with a wide tooth 193 which is adapted to co-operate with a corresponding wide recess 185 (Fig. 15) formed in the resetting segment 175. It will, of course, be evident that if the resetting segment is moved out of its normal position the lower shaft 58 cannot be shifted due to the engagement of the large tooth 193 with the side of the teeth of the operated resetting segment 175.

At this time it should also be pointed out that it is desirable to lock the resetting shafts in their normal positions, thereby counteracting any tendency of the operated totalizer pinions to rotate the shafts due to the friction existing between the spring-pressed pawls and the periphery of the shaft. The devices employed to prevent this comprises pins 143 (Fig. 10) projecting from the right side of the upper and lower totalizer frames. Normally co-operating with these pins are holes 142' which, as best shown in Figs. 9 and 15, are formed in the gears 176 and 177 attached to their associated totalizer resetting shafts 58. It will be evident that due to the co-operation of the pins with the holes formed in the gears, the gears and shafts will be locked against rotation. However, when a shaft is shifted laterally to permit resetting and then the resetting handle is given a partial movement, the pin 143 will contact with one side of the shifted gear 176 or 177 and will thus also assist in holding the gear in its shifted position during its resetting movement. When the gear is brought to its normal position, suitable springs (not shown in the present application, but disclosed in detail in the patents previously mentioned) will act upon the shaft 58 so that the hole in the gear will again co-operate with the pin carried by the totalizer which has just been reset.

*Full stroke for resetting segment*

In order to insure a complete operation of the resetting segment when once begun there is pivoted to the resetting segment 175 a locking pawl 194 which normally (Fig. 15) has a locking edge 195 bearing against a square lug 196 integral with the right frame 25. A spring 197 interposed between the locking pawl 194 and the holding pawl 198 also pivoted upon the segment 175 tends to rotate the pawl 194 clockwise. When the resetting segment 175 is drawn forwardly the locking edge 195 leaves the lug 196 and the parts now assume the position shown in Fig. 16. It will, therefore, be impossible to fully return the resetting segment after the small initial movement, without first completing the forward movement. As the resetting segment is moved still further the pawl 194 will strike a stationary member which happens to be, in the machine herein disclosed, a portion of the differential frame 45 (Figs. 2 and 17) associated with the dimes bank of keys, which at this time is in its normal position. This occurring at the end of the forward stroke of the segment, will tend to rock pawl 194 counter-clockwise and through the action of the spring 197 the pawl 198 will be rocked clockwise until its upper end 200 engages the end 199 of pawl 194 as shown in Fig. 17. As the segment 175 is then moved rearwardly the holding pawl 198 will serve to hold the pawl 194 in its shifted position by the pressure of spring 197, this being accomplished by means of the end 201 contacting with the locking edge 195 of pawl 194. The parts are so designed that the edge 195 will clear the lug 196 when the segment is brought to its normal position. However, at the extreme rearward movement of the segment 175 the vertical forward edge of the lug 196 will contact with a projection 202 of the pawl 198 and cause it to be rocked about its pivot to thereby disengage the ends 195 and 201. The pawls will then again assume the positions shown in Fig. 15.

To prevent improper access to the full stroke enforcing device there is provided a shield 2031 (Fig. 9) enclosing the operating parts. The shield is riveted to the segment and is of box formation so as to prevent the insertion of an instrument to manipulate any of the parts.

To more effectively prevent any manipulation of the full stroke enforcing devices there is provided a plate or shield 2032, Figs. 3 and 9, riveted to a member 203 attached to the resetting segment 175 and this plate in combination with the shield 2031 completely guards the mechanism during all portions of its movement.

It is essential, furthermore, that means be provided for preventing the insertion of a tool or instrument in the various openings and thereby preventing any fraudulent manual shifting of either resetting shaft so as to perform a resetting operation by movement of the resetting handle 180 which, as previously mentioned, is located under the lid 28 normally accessible to the clerk. To this end the yoke member 183 and knobs 181 carried by resetting shafts 58 are completely covered by means of a cover 204 (Fig. 2) which effectively prevents the fraudulent mis-operation just mentioned.

*Interlocking devices between resetting and total printing devices*

While a full-stroke mechanism has been provided for the resetting lever it would still be possible to operate the total taking and resetting devices simultaneously and thus print an incorrect total if no preventive means were provided. The total printed would be incorrect by an amount equivalent to that deducted from the totalizer by an actuation or partial movement of the resetting lever. The member 203, previously mentioned, is pivoted to the resetting segment by a stud 205 (Figs. 3 and 9) and is bifurcated at its rear end to straddle a stub shaft 206 attached to the inside of the frame 25. Pivoted upon the stud 206 is a plate 207 formed with a cam slot 208 engageable with a stud 209 carried by the member 203. The plate is formed with a hook 210 co-operating with the main operating printer shaft 66 and an edge 211 which is concentric with respect to the shaft 44 about which the printer frame may be swung. From the above, it will be observed that when the printer is rocked about its pivotal point 44, the shaft 66 will pass over the concentric edge 211 thereby locking the resetting lever 175. Actuation of the resetting lever will, through the pin 209 co-operating with the cam slot 208 rock the plate 207 rearwardly thereby bringing the hook 210 over the printer shaft 66 and locking the printer against movement.

Due to the above described mechanism it will be impossible to take a total and perform resetting of the totalizer at the same time. Obviously, the total should be printed before resetting, but after the totalizer has been reset the proof of this may be obtained by again rocking the printer to ascertain whether or not all the printing wheels are at zero.

*Interlocking devices between resetting mechanism and control lever*

To prevent mis-operations of certain characters the resetting lever and control lever are provided with co-acting means for preventing operation of the resetting lever if the control lever is shifted from the "Total and reset" position, and which will, furthermore, prevent movement of the control lever out of this position if the resetting lever has been partially operated.

This mechanism is best shown in Figs. 2, 3, 8 and 9. Referring to Fig. 8 it will be noted that attached to the rearward end of the bell-crank 165 by a pin 212 is an upwardly extending member 213 which passes through an opening 214 in the key coupler 33 and is bifurcated at its upward end to straddle the shaft 40. It will be clear that since the member 165 is connected to the member 213 the latter will be moved only as the control lever 148 is shifted to and from the "Total and reset" position. Other movements of the control lever between the remaining three positions will not affect the lever 165 or the member 213. In the normal position, that is, when the keys are free to be operated, or in any of the three lower positions of the control lever, the member 213 is in the position shown in Fig. 3 wherein it will be noted that a projection 215 carried by the member 213 is directly in front of a shoulder 216 formed on the under side of the member 203. It will be clear, therefore, that when the control lever is out of the "Total and reset" position the resetting lever 180 will be locked against any movement. However, when it is desired to perform a resetting operation the control lever may be moved to the "Total and reset" position, thereby rocking the bell-crank 165 counter-clockwise (as viewed in Fig. 8) and bringing the member 213 downwardly until the projection 215 is disengaged from the shoulder 216. Now when the resetting operation is commenced the member 203 will be drawn forwardly as shown in Fig. 9 so that the edge 217 of the member 203 co-acts with the projection 215. It will be obvious, therefore, that due to the co-action of these elements the member 213 will be held in its lowered position whenever the resetting lever is partially operated and it will be impossible to move the control lever out of the "Total and reset" position until the resetting lever and the member 203 are returned to their normal positions. While this mechanism is very simple it provides an adequate preventive for the various misoperations to which the mechanisms might be subjected if simultaneous or incomplete operations of the total printing, resetting and item entering mechanisms were permitted.

*Auditor's control of the cash register*

As has been previously stated in order to permit the resetting operation it is necessary to first bring the control lever into the "Total and reset" position to unlock the resetting lever and then by means of the lock 189 permit the resetting of either totalizer as desired. Where one person is to have control over the total printing and resetting operations the keys for the two locks may be the same or the special resetting lock may be omitted, but the provision of a separate lock to operate the resetting shaft permits the use of separate keys for the control lever lock and the resetting device. In some store systems it may be desirable to give an auditor the sole control over resetting of the totalizer, thus leaving only the total printing under control of the manager of the store. In other systems it may be desirable to permit the manager to reset the totalizer periodically, but to insure that the resetting operation is always complete and in order that there will be no chance for irregular operations of any of these parts, the various interlocking devices just described have been provided.

It will be noted from what has been premised hereinbefore that since it is possible to rock the frame downwardly to print a total and since the platen can be lifted upwardly by means of the connections previously described, it would normally be possible to lift the platen up when it is positioned over the totalizer and thereby render improper access to the wheels. To overcome this objection a suitable mechanism is provided which, when the printer frame is in its normal position, permits the raising of the platen and when the latter is raised locks the printer against movement. The co-operation of the platen with one of the shields prevents raising of the platen when the printer frame has been rocked downwardly away from its normal position so as to print a total.

As shown in Fig. 3, the right hand supporting arm 70 for the platen 68 is provided with a projection 218 (Fig. 3) which is in the plane of a bracket 219 attached to the guide plate 521 which, as already explained, guides the operating segments 49 in their reciprocating movements. When the platen is elevated to the dash-dot line as shown in Fig. 3 and an attempt is made to move the printer downwardly, the printer will be locked against movement by the co-action of the projection 218 with the bracket 219. However, if sufficient force is applied the bracket will bear against the lug 218, thereby rocking the platen 68 downwardly to its normal position. It will also be clear from an inspection of Fig. 2 that when the printer frame is moved downwardly from its normal position, the upper edge of the platen will be positioned under the extreme end of the cover 136 of the hood 134 thereby preventing any raising of the platen when it has been moved to obtain a total imprint from either totalizer.

It will be obvious that due to these provisions the various item registering, total printing and resetting operations must be correctly performed, and by the employment of the improved devices illustrated irregular operations which might be attempted by dishonest employees will be effectively prevented.

*General summary of operation*

The nature of the improved mechanism is such that in order to make the foregoing description as clear as possible it was necessary to state the operation considerably in detail as an incident to explaining the various features of construction. A complete restatement here of the operation is therefore believed to be unnecessary. However, a résumé of the general operation of the machine will be given to co-ordinate the operation and functions of the various parts which have been described in detail.

Let it be assumed that the machine is of the type which is designated as a "proprietor's" machine and that the machine is used for accumulating the sales of a day. The control lever is usually left in one of the positions wherein item registering operations will be permitted and the lid 28 is retained in its locked position preventing unauthorized persons from having access to the mechanisms located beneath.

To enter the first transaction which will be assumed to be a transaction made by clerk "A" amounting to $1.65 the clerk's key will be depressed together with the appropriate keys in the dollars, dimes and pennies bank so that depression of these keys will permit the notches 36 in the rear ends of the keys to engage the flange 35 of the key coupler 33. Through suitable engaging mechanism (shown in detail in the patents previously mentioned) the corresponding totalizer will be drawn into engagement with the differentially operated racks 49. As the proper keys are depressed the associated rollers 42 (Fig. 2) carried by the arms 41 integral with the keys 29 will work in the associated cam slots 48 of the differential frames related to the three banks. The frames 45 will each be differentially operated so as to move the racks 49 (Fig. 3) an amount commensurate with the depressed keys. Since the totalizer pinions 59 are drawn into mesh with the actuating racks 49 before the racks have moved the operated racks will move the pinions 59 differentially so that the amount $1.65 will be added on the totalizer elements 57. On the return of the keys to normal position the totalizer pinions will be disengaged from the racks so that the return movement of the latter will not affect the amount registered.

As the key coupler 33 is elevated it will raise the rack plate 38 (Fig. 2) through the connection 37 so that the rack teeth 39 will alternately mesh with a gear fast to the main operating shaft 40. It will be understood that the alternate engagement by the rack teeth with the gear will give the shaft 40 a complete rotation during each operation of the machine.

As the segmental frame 45 associated with the units order is operated differentially by the depression of the 5¢ key in this bank the rack 49 meshing with the pinion 50 attached to the item type wheel 51 of the units order will be brought to the "five" position where it will imprint the corresponding character upon the record strip when the machine is operated further. In the same manner the differential frames 45 associated with the other two groups of keys will likewise bring their associated item type carriers to the printing line to print the desired characters upon the impression material.

During the downward depression of the operating keys the box cam 662 (Fig. 2) operating upon the bell-crank 661 will rock the shaft 66 and through the arm 89 (Fig. 4) and the nose 88 formed thereon coacting with the lug 87 will retract the pawl 83. Since the retracting pawl 83 is carried by the hammer 74 the latter will also be rocked downwardly against the tension of the spring 81. Upon a further movement of the arm 89, the nose 88 will clear the lug 87 of the pawl 83 and permit the hammer 74 to strike the lug 73 and through the clutch connection 75 (Fig. 1) rock the platen 68 downwardly to effect a printing impression from the adjusted type carriers.

As described in detail in the patents hereinbefore mentioned, the record strip is advanced after each printing operation.

During the downward depression of the keys the shaft 66 will be rocked counter-clockwise (Fig. 5) and through the arm 114 (Figs. 5 and 13) and the bell-crank 112 the pawl 111 will be lifted upwardly so that the lower edge of the curved lug 110 carried thereby will engage the upper edge of one of the ratchet teeth of the ratchet wheel 109. During the return movement of the operated key and after the printing operation has been performed the shaft 66 will be rocked clockwise thereby forcing the pawl 111 downwardly and through its cooperation with the ratchet teeth of the ratchet wheel 109 will turn the inking spool 96 slightly causing an advancement of the endless ribbon.

Items are successively registered in the machine in substantially the same manner as has just been described, it being, of course, clear that when the clerk "B" desires to register an amount he will operate his corresponding key with the proper amount keys. The operation of the mechanism will be substantially as that just described, with the exception that the other totalizer will be drawn into engagement.

It will be assumed for some reason or other, that the clerk desires to obtain access to the inking mechanism to either replace a worn-out inking ribbon or to replenish the ink supply. As has been previously described this mechanism is under the control of the clerk and he merely inserts the key in the lock 133 (Fig. 1) carried by the hood 134 and through the arm 142 rocks the shaft 139 (Fig. 2) thereby disengaging the hooks 140 from the flanged studs 141 carried by the upper lid 28. This will unlock the lid 28 whereupon it may be lifted upwardly to obtain access to the printing mechanism.

The clerk then slides the clutch 75 to the right (as shown in Fig. 1) disengaging the rib 77 carried by the arm 70 from the groove 76 formed in the slidable clutch 75. Depression of the finger piece 127 will then through the connections to the shaft 67, rock it and lift the platen 68 upwardly slightly and due to the concentric portions of the slots 118 and 122 (Figs. 2 and 5) formed in the members 117 and 123 respectively, no movement will be imparted to the ribbon supporting members 99 and 106. However, a continued upward movement of the platen will, through the cam slots co-operating with the studs 115 and 121 carried by the members 117 and 123, respectively, rock the ribbon supporting members 99 and 106 about their respective pivotal points 100 and 108. Since the ribbon supporting devices are carried by these members they will be lifted upwardly together with the ribbon thus facilitating access to the latter.

As illustrated in Fig. 1, the resetting lever 180 and total printing members 128 and 131 are located under the lid 28 and, therefore, are accessible to the clerks. However, since the control lever 148 (Fig. 6) has not been shifted from the position permitting item entering operations, the resetting lever 180 will be locked by virtue of the engagement of the projection 215 (Fig. 3) carried by the member 213 with the shoulder 216 carried by the element 203 attached to the resetting segment 175. The printing mechanism is also locked against operation due to the co-action of the stud 147 (Figs. 4 and 8) carried by the right printer support frame 62 with the rearward end of the locking arm 145. It will be obvious, therefore, that the clerk, while he has access to these mechanisms, cannot operate them due to the provision of the locking devices just described.

At the termination of a day's business it is desirable to obtain the necessary information in printed form and to this end the proprietor inserts his key in the lock carried by the control lever 148. Rotation of the key in the lock 153 will turn the flange 154 (Fig. 6) thereby bringing the slot formed therein in the plane of the plate 156. Since the lock is carried by the control lever 148 it is forced rearwardly together with the key and lever and through the gear mechanism 157, 158, 159 and 160 will rock the shaft 161 and due to the fact that the stud 164 carried by the bell-crank 165 co-operates with the cam portion of the slot formed in the disk 162, the bell-crank 165 will be rocked counter-clockwise as viewed in Fig. 8. The pin 166 carried by the bell-crank will co-operate with the cam slot 167 thereby lowering the arm 168 and through the inter-connected spring 169 forcing the arm 145 downwardly out of co-operation with the stud 147 thereby unlocking the printer for operation.

Simultaneously the arm 171 will be brought in front of the arm 172 carried by the key coupler 33 and it will be evident, therefore, that the keys will be locked against operation as long as the control lever is in the "Total and reset" position.

It will also be clear from Fig. 2 that when the bell-crank 165 is rocked counter-clockwise the pin 173 carried at its extreme upper end will, through its co-operation with the arm 174 attached to the shaft 139, rock the shaft 139 to disengage the hooks 140 from the flanged studs 141 permitting the proprietor to elevate the released lid 28.

At the same time that the bell-crank 165 was being rocked counter-clockwise it drew the arm 213 (Figs. 3 and 8) downwardly to disengage the projection 215 from the shoulder 216 carried by the member 203, thereby unlocking the resetting lever 175 for operation.

In order to take a total from the upper totalizer the manipulative device 128 (Figs. 1 and 3) is grasped and rocked downwardly and by drawing it and the printer frame which will rock about the shaft 44 as a pivotal point, the stud 129 will enter the groove 130 and further movement of the printer frame will cause the clockwise rotation of the shaft 66 to the same extent that the box cam 662 rocks it during a regular operation of the machine. This will release the printing hammer 74 at substantially the time that the platen 68 overlies the total printing elements 55 of the upper totalizer. Whenever a total is printed the record strip will be fed an increment and furthermore, since the pawl 111 co-operates with the ratchet teeth of the ratchet wheel 109 the inking spool 96 will be moved slightly, thereby causing an advancement of the inking ribbon in the same manner as when an item is registered in the machine.

In order to obtain the total of the amount standing on the lower totalizer, there is provided a manipulative device 131 (Figs. 1 and 3) which is integral with the right printer side frame 62. When the printer frame is rocked about its pivotal point by grasping the manipulative device 131 and drawing it downwardly, the stud 129 will enter the slot 132 and cause a relative turning movement of the shaft 66 and the printer frame thereby retracting and releasing the hammer 74 at substantially the time the platen is over the lower totalizer. It will be understood, of course, that after printing from the lower totalizer takes place the inking ribbon and record strip will also be fed an increment in the usual manner.

As best seen in Fig. 3 it will be noted that when the platen 68 is lifted upwardly for some reason or other, the printer frame cannot be rocked downwardly due to the co-operation of the projection 218 carried by the supporting arm 70 with the bracket 219 carried by the segment guide 521. This will prevent the rocking of the printing mechanism while the platen is out of its normal position and furthermore, it will be seen (Fig. 2) that when the platen 68 has been rocked downwardly to effect a printing impression, the upper edge of the platen 68 will be positioned under the cover 136 of the hood 134 thereby preventing any raising of the platen when it has been moved from normal.

When the printer frame is drawn downwardly to effect printing impressions from either totalizer the shaft 66 (Fig. 3) will pass over the concentric edge 211 formed on the plate 207. This will prevent any rocking of the plate 207 and the drawing of the resetting lever and the member 203 forwardly since the member 203 is connected to the plate 207 by the pin and slot connection 208 and 209. When the printing mechanism is in its normal position the resetting lever will be free to be operated.

In order to restore the totalizer elements to zero, the resetting lever 175 is drawn forwardly from the position shown in Fig. 15 to the position shown in Fig. 9.

In the "proprietor's" type of machine the key of the resetting lock 189 would ordinarily be the same as the key of the lock which permits adjustment of the control lever 148. However, if the keys of the respective locks should differ from each other the proprietor would, of course, have possession of both of these keys.

If it is desired to reset the upper totalizer the key of the lock 189 will be rotated in a counter-clockwise direction, thereby rocking the yoke 183 (Fig. 11) and through the upper projection 182 contacting with the knob 181 attached to the resetting shaft 58 shifting the latter longitudinally to bring the gear 176 (Fig. 10) in mesh with the teeth of the resetting segment 175. Shifting of the shaft 58 will bring the notches 178 formed therein into alignment with the pawls 179 (Fig. 14) carried by the various totalizer elements so that as the shaft is rotated the notches will co-operate with the variously positioned pawls thereby restoring the totalizer elements to zero. The gear 176 will be held in its shifted position during a resetting operation by the pin 143 carried by the upper totalizer frame co-acting with one side of the gear 176. When the gear is returned to its normal position a spring will act upon the shaft 58 to bring the pin 143 and the hole 142′ (Fig. 9) in the gear 176 in normal relationship with each other.

When it is desired to reset the lower totalizer 55 the operation will be substantially as that just described in connection with resetting the upper totalizer 54 with the exception that the key of the lock 189 will be rotated in a clockwise direction thereby shifting the lower totalizer shaft 58 to bring its gear 177 into mesh with the teeth of the resetting segment 175.

If an attempt is made to mesh the gear 176 with the partially operated resetting segment 175 it will be prevented by the shield 192 carried by the resetting segment 175. Likewise any attempt to shift the lower resetting shaft 58 after the resetting segment has been partially operated will be prevented by the co-action of the broad tooth 193 of the gear 177 with the side of the teeth of the resetting segment 175.

A full stroke of the resetting segment will be insured because when the resetting segment is partially operated the locking edge 195 (Fig. 15) of the locking pawl 194 will leave the lower surface of lug 196 and assume the position shown in Fig. 16 so that it will be impossible to fully return the resetting segment after the initial movement until the forward movement has been first completed. When the resetting segment is moved still further the pawl 194 will strike a portion of the differential frame 45 (Fig. 17) which will rock the pawl 194 counter-clockwise while through the action of the spring 197 the pawl 198 will rock clockwise until the upper end 200 of the latter engages the end 199 of the pawl 194. At the extreme rearward movement of the segment 175 the vertical forward edge of the lug 196 will contact with the projection 202 of the pawl 198 and cause it to be rocked about its pivot to disengage the ends 195 and 201.

As the resetting segment is moved forwardly it will draw the member 203 (Fig. 3) and through the pin 209 co-operating with the slot 208 in the plate 207 will bring the hook 210 over the printer shaft 66 thereby locking the printer against movement while resetting is being performed.

In order to prevent mis-operations such as would arise from the incomplete and simultaneous operation of the resetting and item entering mechanisms, means are provided to lock the control lever when the resetting segment is operated. It will be clear from Fig. 9 that when the resetting segment 175 is partially operated the edge 217 of the member 203 will contact with the projection 215 thereby holding the member 213 down and making it impossible to move the control lever out of the "Total and reset" position until the resetting segment and member 203 are returned to their normal positions.

In the event that the machine illustrated is to be used as an "auditor's" machine the manager of the store is given the key of the lock 153 controlling the adjustment of the control lever 148. Since he has no key to the lock 189 which controls resetting operations he will be unable to reset either totalizer even though he may have access to the resetting lever 180. When the auditor desires to reset the various totalizers it is necessary for him to either have a key to the lock 153 controlling the adjustment of the control lever or else require the manager of the store to adjust the control lever 148 to the "Total and reset" position to unlock the resetting lever 180. This will require the presence of the manager during the time that the resetting operation is performed and in combination with the various interlocking devices previously described it will preclude the possibility of irregular resetting operations being performed.

While the form of mechanism herein shown and described is admirably adapted to fulfill the objects primarily stated, it is to be understood that it is not intended to confine the invention to the one form of embodiment herein shown, since it may be embodied in various forms, all coming within the scope of the claims which follow:

What is claimed is:

1. In a cash register, the combination of a totalizer, item entering means, a lever for resetting the totalizer, means for locking said lever, a manipulative device movable to one position for controlling said item entering means and to another for controlling a resetting operation, and means under control of the manipulative device for unlocking the resetting lever when the device is adjusted to one of its positions.

2. In a cash register, the combination of a totalizer, item entering means, a normally locked lever for resetting the totalizer, a manipulative device movable to one position for controlling said item entering means and to another for controlling resetting operations, means under control of the manipulative device for unlocking the resetting lever when the device is adjusted to one of its positions, and means for locking the manipulative device when the resetting lever is operated.

3. In a cash register, the combination of a totalizer, a normally locked lever for resetting the same, a cabinet, a lid hinged to the cabinet normally locked for preventing access to the resetting lever, a manipulative device, means under control of the manipulative device for simultaneously unlocking the resetting lever and lid, and means for preventing movement of the manipulative device when the resetting lever is operated.

4. In a cash register, the combination of a totalizer, means normally locked for taking total printing impressions from the totalizer, a normally locked lever for resetting said totalizer, a cabinet, a normally locked lid hinged to the cabinet, a manipulative device, means controlled thereby for simultaneously unlocking the lid, the resetting lever and the total printing means, and means for locking the total printing means when the resetting lever is operated.

5. In a cash register, the combination of a resetting lever, a member attached to said lever carrying a shoulder, an element normally co-operating with said shoulder, and a manipulative device for moving the element to disengage it from the shoulder to free the resetting lever, said member having provisions for locking the element and manipulative device when the resetting lever is moved.

6. In a cash register, the combination of a plurality of keys, a totalizer, means normally locked for taking total printing impressions from the totalizer, a normally locked lever for resetting said totalizer, means for preventing simultaneous operation of said lever and first mentioned means, a cabinet, a normally locked lid hinged to the cabinet, a manipulative device, and means controlled thereby for simultaneously unlocking the lid, the resetting lever, and the total taking means and locking the keys.

7. In a machine of the class described, a plurality of totalizers each comprising a series of wheels, a shaft for supporting each totalizer and adapted to reset its corresponding wheels, a single lock controlled member for selectively controlling the effectiveness of said shafts for resetting, a latched lid normally concealing said controlling lock, a normally locked resetting lever, and manipulative means for simultaneously releasing said lid latch and said resetting lever to permit resetting of either totalizer.

8. In a machine of the class described, a plurality of totalizers each comprising a shaft slidable to enable resetting, a resetting member common to said shafts for causing resetting, means normally locking said member against movement, normally inaccessible means for selectively shifting said shafts to enable resetting, a manipulative device for simultaneously rendering said last mentioned means accessible and unlocking said resetting member, and co-acting means carried by said member and said shafts whereby said shafts are maintained in shifted or unshifted positions during movement of the member.

9. In a machine of the class described a totalizer, item entering means therefor, a normally locked resetting member, and a manually operable control member for unlocking said resetting member and simultaneously locking said item entering means against operation, said resetting member having provisions for locking said control member in adjusted position upon movement of said resetting member.

10. In a machine of the class described, a totalizer, resetting means therefor, an element normally locking said means, means for printing totals from said totalizer, an element normally locking said total printing means, a normally locked lid for concealing said resetting and total printing means, and a cam member with connections for simultaneously releasing said lid and controlling both of said elements to release said resetting and total printing means.

11. In a machine of the class described, a totalizer, a lever for resetting said totalizer, a link attached to said lever for movement therewith, a member normally blocking movement of said link, a control element, and a cam disk operated by said element for rendering said member ineffective.

12. In a cash register, the combination of a totalizer, a shaft supporting said totalizer, a lever for resetting the totalizer and normally locked independently of said shaft, a cabinet, a lid hinged to the cabinet and normally locked for preventing access to the resetting lever, a manipulative device and means under control of the manipulative device for simultaneously unlocking the resetting lever and said lid.

13. In a cash register, the combination of a totalizer, means to enter items therein, a lever to reset the same to zero, a shouldered member attached to said lever, an element normally cooperating with the shoulder, a manipulative device movable to one position to condition the machine for item entering and to another position for resetting, and a connection between the manipulative device and the member, operative to free the shoulder from the influence of the element when the manipulative device is moved from the item entering position to the resetting position.

In witness whereof I have signed my name hereto this 1st day of June, 1925.

CHARLES W. GREEN.